Figure 1:
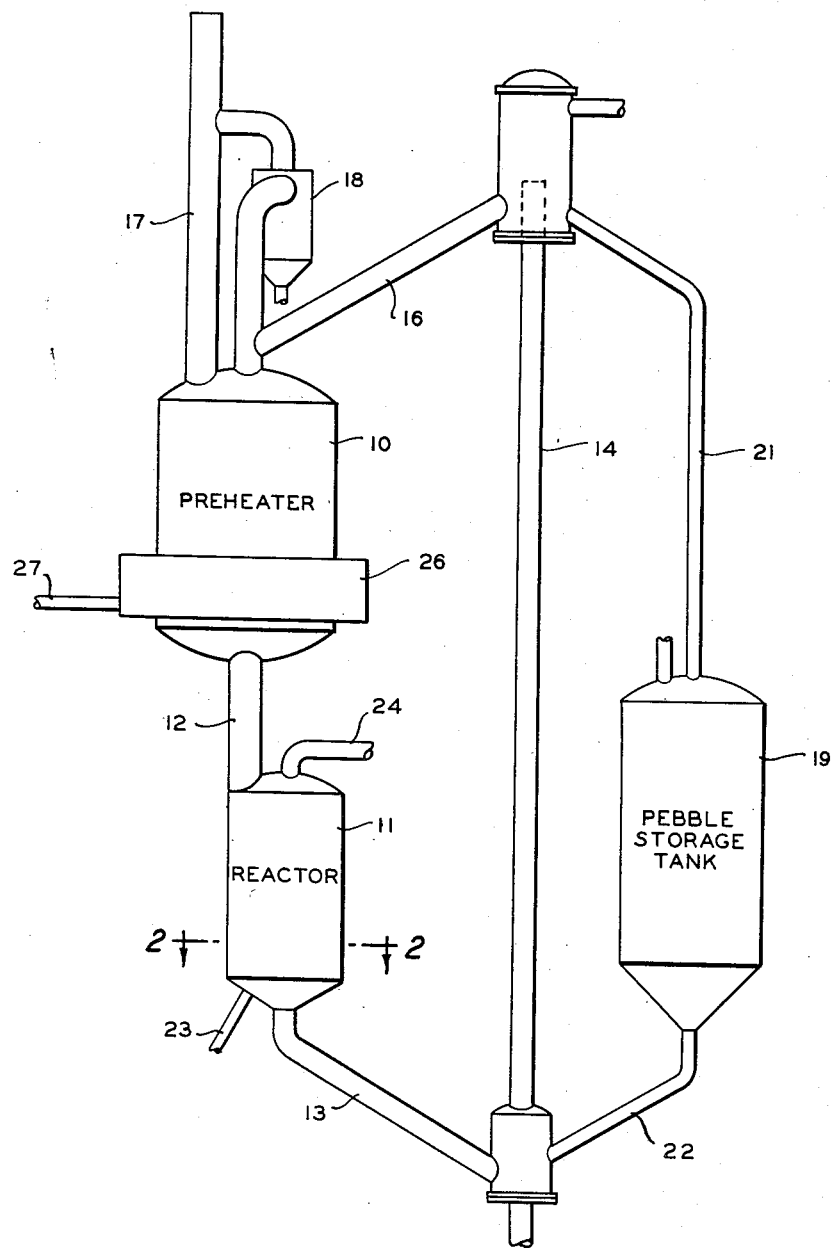

March 5, 1957  C. E. FORKEL ET AL  2,784,066
PEBBLE HEATER APPARATUS
Filed April 19, 1954  2 Sheets-Sheet 1

INVENTORS
C. E. FORKEL
D. S. HALL
L. E. DEAN
BY Hudson and Young
ATTORNEYS

March 5, 1957 C. E. FORKEL ET AL 2,784,066
PEBBLE HEATER APPARATUS
Filed April 19, 1954 2 Sheets-Sheet 2

INVENTORS
C. E. FORKEL
D. S. HALL
L. E. DEAN
BY Hudson and Young
ATTORNEYS

United States Patent Office 2,784,066
Patented Mar. 5, 1957

2,784,066

PEBBLE HEATER APPARATUS

Curt E. Forkel, Bartlesville, Okla., Dick S. Hall, Borger, Tex., and Lloyd E. Dean, Bartlesville, Okla., assignors to Phillips Petroleum Company, a corporation of Delaware Application April 19, 1954, Serial No. 424,124

5 Claims. (Cl. 23—284)

This invention relates to pebble heater apparatus. In one of its more specific aspects, it relates to apparatus for introducing gaseous material into a pebble contacting chamber. In a further aspect, it relates to an expansion joint, this joint providing means for placing a member within a chamber containing pebbles and subjected to widely varying temperatures.

Thermal conversion processes which are carried out in so-called pebble heater apparatus utilize a flowing mass of solid heat exchange material, which mass is heated to a high temperature by passing hot gas therethrough in a first direct heat exchange step and is then caused to contact gaseous reactant materials, furnishing heat thereto in a second direct heat exchange step. The conventional pebble heater apparatus generally comprises two chambers which may be disposed in substantially vertical alignment. The solid heat exchange material is introduced into the upper portion of the first or upper chamber. That material forms a moving bed of solid heat exchange material which flows downwardly through the chamber in direct heat exchange with hot gaseous heat exchange material. The solid heat exchange material is heated to a high temperature in the heat exchange and is then passed to a second chamber in which the hot solid heat exchange material is caused to contact gaseous reactant materials in a second direct heat exchange relation, furnishing heat for the treatment or conversion of the gaseous materials therein.

Solid heat exchange material, which is conventionally used in pebble heater apparatus, is generally called "pebbles." The term "pebbles," as used herein, denotes any solid refractory material of flowable size and form, having strength enough to carry large amounts of heat from the pebble heating chamber to the gas heating chamber without rapid deterioration or substantial breaking. Pebbles conventionally used in pebble heater apparatus are substantially spherical and range from about one-eighth inch to about one inch in diameter. In a high temperature process, pebbles having a diameter between one-fourth and three-eighths inch are preferred. The pebbles must be formed of a refractory material which will withstand temperatures at least as high as the highest temperature attained in the pebble heating chamber. The pebbles must also be capable of withstanding temperature changes within the apparatus. Refractory materials, such as metal alloys, ceramics, or other material having the properties above-described may be utilized to form such pebbles. Silicon carbide, alumina, periclase, beryllia, stellite, zirconia, and mullite may be satisfactorily used to form such pebbles or may be used in admixture with each other or with other materials. Pebbles formed of such materials, when properly fired, serve very well in high temperatures, some withstanding temperatures up to about 3500° F. Pebbles which are used may be either inert or catalytic when used in any selected process.

Problems involved in the operation of such apparatus include the design of the chamber so that pebble flow is as evenly distributed as possible over the cross-section of the pebble chamber. One method of solving this problem is to provide an obstruction in the center of the lower portion of the chamber, such an obstruction causing the pebbles to flow around the same. The velocity of pebble flow tends to decrease in the central portion of the chamber and to increase around the periphery thereof, the net result being that the flow is approximately even throughout the chamber. Such a baffle can also aid in distributing gaseous material to the pebble bed.

Different types of materials of construction are frequently used for these various components of the apparatus. As a result, there is unequal expansion due to the different coefficients of expansion. Furthermore, there is a considerable temperature difference between the inner portions of the pebble bed and the outer walls of the apparatus and, even if the components have equal coefficients of expansion, there is unequal expansion. In such cases, a solid connection between the distribution means and the wall of the chamber is impractical. Therefore, one aspect of this invention comprises a particular expansion joint which we have found to be particularly suitable.

Each of the following objects is obtained by at least one of the aspects of this invention.

An object of this invention is to provide improved pebble heater apparatus.

A further object of this invention is to provide a method and apparatus for introducing gaseous material uniformly over the cross-section area of a pebble bed.

A further object of this invention is to provide an expansion joint, for use where members to be joined are subjected to unequal expansion resulting from unequal temperatures and/or dissimilar metals.

Figure 2:
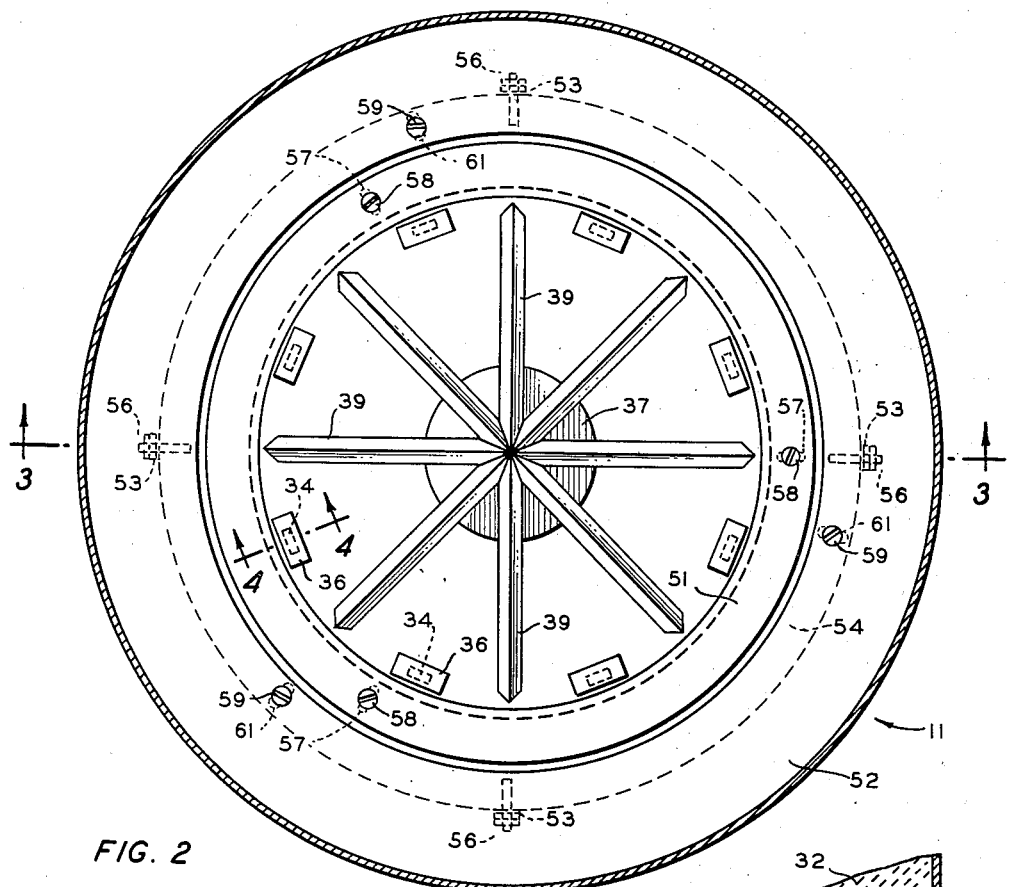
Figure 3:
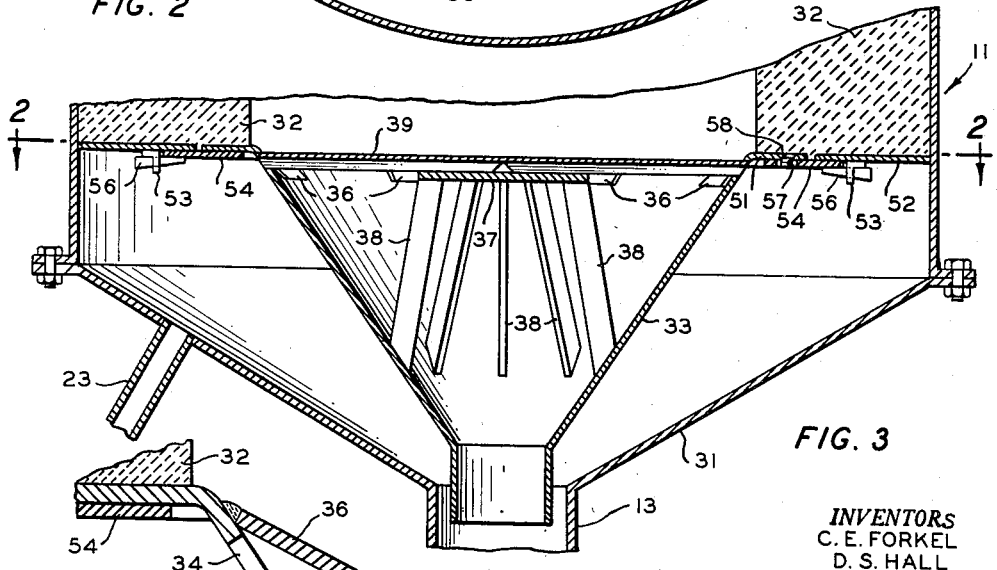
Figure 4:
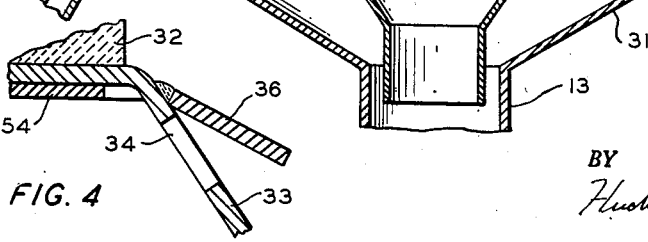

Other objects and advantages of this invention will be apparent to one skilled in the art upon reading the accompanying disclosure, and a study of the drawings, which comprise:

Figure 1, a schematic diagram of a pebble heater-reactor combination,

Figure 2, an enlarged sectional view taken on the line 2—2 of Figure 1,

Figure 3, a cross-sectional view of the feed distributor taken on line 3—3 of Figure 2, and Figure 4, an enlarged sectional view of a feed inlet taken on line 4—4 of Figure 2.

In Figure 1, the preheater 10 is positioned above reactor 11 and pebbles flow from chamber 10 to chamber 11 through conduit 12. Conduit 13, extending from the lower end portion of reactor 11, communicates with elevator 14. Conduit 16 connects the upper end portion of elevator 14 and the upper end portion of chamber 10. Chamber 10 is also provided with a stack 17 and an elutriator 18. Provided adjacent elevator 14 is a pebble storage tank 19, this being connected to elevator 14 by conduits 21 and 22. Conduits 23 and 24 are the gaseous material inlets and outlets for reactor 11. Furnace 26, provided with fuel supply conduit 27, is positioned around the lower end portion of chamber 10.

Figure 2, a view taken on line 2—2 of Figure 1, is a view looking downward upon the feed distributor of this invention, and Figure 3 is a cross-section view of Figure 2 taken on line 3—3. These figures can be described together. 11 represents the reactor, this being provided with a conically shaped bottom 31 and the pebble outlet conduit 13. Insulating material 32 is provided within chamber 11. An inner funnel shaped member 33 guides the pebbles from the chamber 11 to pebble conduit 13. The space between funnel shaped member 33 and the outside of the reactor 11 provides a plenum chamber. This funnel shaped member 33 is provided with means for introducing reactant material evenly across the cross-section area of the downwardly moving pebble bed. These means comprise a series of holes positioned adjacent the upper edge of funnel member 33, one series being holes 34 covered by shingle plates 36. Gas flows from the plenum chamber through holes 34 into the outer portion of the pebble bed while the shingles 36 prevent the flow of pebbles into the plenum chamber. Means are also provided for the introduction of gas to the inner portion of the pebble bed. This means comprises a plate 37 supported by members 38, these support members extending downwardly to funnel shaped member 33 and, positioned upon plate 33 and extending radially to the outside edge of funnel 33, inverted V-shaped members 39, these conveniently being inverted angle irons. These angle irons extend to the edge of the funnel members, the ends thereof being off-set with respect to holes 34. Furthermore, these angle irons are preferably positioned directly above the support members 38, such an arrangement presenting the least resistance to pebble flow through the funnel shaped member.

Located immediately below the outer end of each of said inverted V-shaped members 39, additional holes in the funnel shaped member 33 are provided which allow gas to flow from the plenum chamber under the V-shaped members and out into the pebble bed. We have found that such an arrangement provides approximately uniform gas distribution throughout the pebble bed, and at the same time provides uniform pebble flow through substantially the entire heighth of the reaction chamber.

Since the temperature within the pebble bed ranges from several hundred to a few thousand degrees, and the outside of reactor 11 remains at a much lower temperature, a special expansion joint is required to hold the funnel shaped member 33 within the chamber 11. Preferably, the funnel 33 is centrally located within chamber 11 in order to provide equal pebble flow at all points on the periphery of the chamber.

For this purpose, we have provided a particular expansion joint, this being shown most clearly in Figure 3. Although not limited thereto, this joint is especially applicable since it provides means for keeping all of the components concentrically located. The upper end of funnel 33 is flanged outwardly from a lip 51. Support member 52, attached to the outer wall of chamber 11, is positioned in the same plane as lip 51 but spaced therefrom to allow for expansion. Attached to support member 52 is a bracket 53. A band 54 extends completely around and immediately below the outer edge of lip 51 and the inner edge of member 52. This band 54 is held in place by wedge 56 carried by bracket 53. These wedges 56 may be tack welded in place after assembly, if desired. Band 54 is provided with a series of slots 57 positioned below lip 51 and slots 61 positioned below member 52. Pins 58, attached to lip 51, extend into slots 57, and pins 59, attached to member 52, extend into slots 61. These pins, which extend into their respective slots, aid in assembly of this apparatus and keep the components in position following said assembly while allowing limited movement.

In operation, the reactant material is introduced into the plenum chamber and flows through the holes under the end of the angular irons and through holes 34 and through the holes under the ends of the angle irons. Since the pebbles are heated to several hundred degrees, funnel member expands and tends to close the gap between lip 51 and support member 52. Pins 58 permit adequate radial movement of the upper portion of the funnel and the band, independently, but prevent the funnel and band from moving off center. Gases are prevented from flowing downwardly through conduit 13 by means of a steam seal (not shown) in this conduit 13.

Thus, it will be seen that we have provided a method for supporting funnel member 33 within the lower portion of chamber 11. It is supported only at the top thereof, the lower end extending into, but not in contact with, conduit 13.

As many possible embodiments may be made of this invention without departing from the scope thereof, it is to be understood that all matter herein set forth or shown in the accompanying drawing is to be interpreted as illustrative and not as unduly limiting the invention.

We claim:

1. Apparatus for positioning a member within a chamber, unequal expansion of said member and the walls of said chamber preventing rigid construction therebetween, comprising an outwardly extending lip on said member; an outer support member surrounding and in the plane of said lip, spaced therefrom, and attached to the outer wall of said chamber; a plurality of brackets attached to said outer support member; and a second member positioned below said lip and said outer support member of sufficient size to cover the space between said lip and said outer support member, said second member being held in place by a wedge carried by each said bracket.

2. Apparatus for positioning a member within a chamber, unequal expansion of said member and the walls of said chamber preventing rigid construction therebetween, comprising an outwardly extending lip on said member; an outer support member surrounding and in the plane of said lip, spaced therefrom, and attached to the outer wall of said chamber; a plurality of brackets attached to said outer support member; a second member positioned below said lip and said outer support member of sufficient size to cover the space between said lip and said outer support member, said second member being held in place by a wedge carried by each said bracket; and pins in said lip, said pins extending into slots in said second member.

3. In a pebble heater apparatus utilizing a moving bed of pebbles, a reactor chamber comprising an upright, closed shell provided with a pebble inlet in its upper end portion and a pebble outlet in its lower end portion; a gaseous effluent conduit in its upper end; a funnel in the lower portion of said reactor, the lower portion of said funnel communicating with the pebble outlet of said reactor, said funnel and the outer shell of said reactor forming a plenum chamber; openings around the upper periphery of said funnel; a feed conduit communicating with said plenum chamber; a plate substantially centrally located near the top of said funnel, said plate being of considerably smaller area than the cross-sectional area of the upper portion of said funnel; a plurality of inverted V-shaped members extending from the upper periphery of said funnel to the center portion of said plate, said V-shaped members being offset with respect to said first-mentioned openings; openings in said funnel below the outer terminal of each of said inverted V-shaped members; a plurality of bracing members extending downwardly from said plate to said funnel, said bracing members being positioned vertically below said V-shaped members; an outwardly extending lip on the upper edge of said funnel; an outer annular member surrounding and in the plane of said lip spaced therefrom and attached to the outer wall of said shell; a plurality of brackets attached to said outer annular member; a second annular member positioned below said funnel lip and said outer annular member of sufficient size to cover the space between said lip and said outer annular member, said second annular member being held in place by a wedge carried by each said bracket; and pins in said lip, said pins extending into slots in said second annular member.

4. In a pebble heater apparatus utilizing a moving bed of pebbles, a reactor chamber comprising an upright, closed shell provided with a pebble inlet in its upper end portion and a pebble outlet in its lower end portion;

a gaseous effluent conduit in its upper end; a funnel in the lower portion of said reactor, the lower portion of said funnel communicating with the pebble outlet of said reactor, said funnel and the outer shell of said reactor forming a plenum chamber; a feed conduit communicating with said plenum chamber; openings around the upper periphery of said funnel; plates positioned over each of said openings so as to permit gas flow therethrough and into said reactor while preventing flow of pebbles therethrough; a plate substantially centrally located near the top of said funnel, said plate being of considerably smaller area than the cross-sectional area of the upper portion of said funnel; a plurality of inverted V-shaped members extending from the upper periphery of said funnel to the center portion of said plate, said V-shaped members being offset with respect to said first-mentioned openings; openings in said funnel below the outer terminal of each of said inverted V-shaped members; a plurality of bracing members extending downwardly from said plate to said funnel, said bracing members being positioned vertically below said V-shaped members; an outwardly extending lip on the upper edge of said funnel; an outer annular member surrounding and in the plane of said lip spaced therefrom and attached to the outer wall of said shell; a plurality of brackets attached to said outer annular member; a second annular member positioned below said funnel lip and said outer annular member of sufficient size to cover the space between said lip and said outer annular member, said second annular member being held in place by a wedge carried by each said bracket; and pins in said lip, said pins extending into slots in said second annular member.

5. Apparatus for distributing feed gas to a reaction chamber comprising a funnel; openings around the upper periphery of said funnel; a plate substantially centrally located near the top of said funnel, said plate being of considerably smaller area than the cross-sectional area of the upper portion of said funnel; a plurality of V-shaped members extending from the upper periphery of said funnel to the central portion of said plate, said V-shaped members being offset with respect to said first-mentioned openings; openings in said funnel below the outer terminal of each of said inverted V-shaped members; a plurality of bracing members extending downwardly from said plate to said funnel, said bracing members being positioned vertically below said V-shaped members; an outwardly extending lip on the outer section of said V-shaped funnel; an outer annular member surrounding and in the plane of said lip spaced therefrom; a plurality of brackets attached to said outer annular member; and a second annular member positioned below said funnel lip and said outer annular member of sufficient size to cover the space between said lip and said outer annular member, said second annular member being held in place by a wedge carried by each said bracket.

References Cited in the file of this patent
UNITED STATES PATENTS
2,287,777   Boestad _____ June 30, 1942